Kopas & Bauer,
Cage Trap.

No. 102,133. Patented Apr. 19. 1870.

Witnesses:
Victor Haymann
C. A. Pettit

Inventors.
J. O. Kopas
G. W. Bauer
per Munn & Co
Attorneys.

United States Patent Office.

JOHN O. KOPAS AND GEORGE W. BAUER, OF WASHINGTON, DISTRICT OF COLUMBIA.

Letters Patent No. 102,133, dated April 19, 1870.

IMPROVED ANIMAL-TRAP.

The Schedule referred to in these Letters Patent and making part of the same.

To all whom it may concern:

Be it known that we, JOHN O. KOPAS and GEORGE W. BAUER, of the city and county of Washington, in the District of Columbia, have invented a new and useful Impovement in Animal-Traps; and we do hereby declare that the following is a full, clear, and exact description of the same, reference being had to the accompanying drawings forming a part of this specification, in which—

Figure 1:
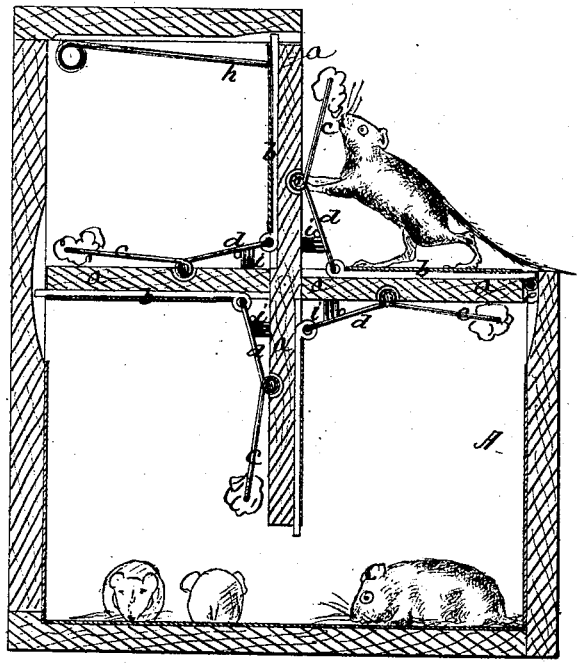

Figure 1 is a sectional, and

Figure 2:
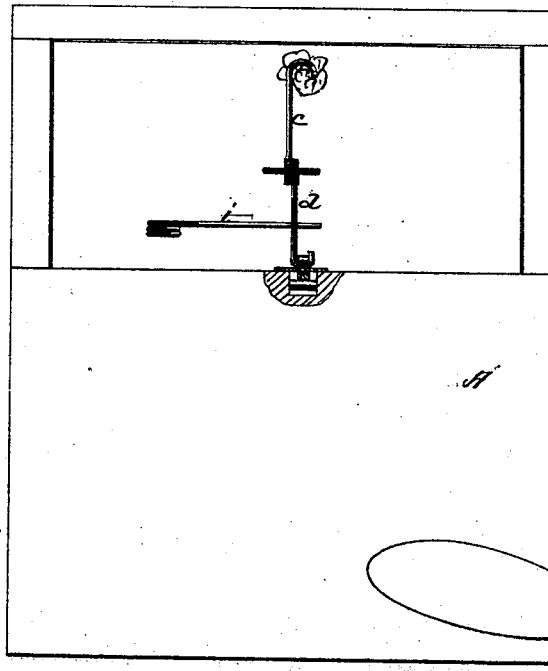

Figure 2, a front elevation.

This invention consists of four or more wooden or iron plates projecting from a common shaft hung in a box, each plate being provided with a bait-holder, so connected with a latch on the next plate in front that, when the animal stands on that one of the plates which is held by its latch in a horizontal position, and pulls at the bait suspended from the nearest vertical plate, such pulling loosens the latch of the horizontal plate, and leaves it free to sink beneath the animal's weight, and precipitate the latter into the box, which operation also resets the trap, and closes the orifice by which the animal entered.

In the drawings—

A is the box.

$a\ a\ a\ a$, the four plates, constituting together a revolving wheel.

$b\ b\ b\ b$, bolts, sliding in one side of each plate.

$c\ c\ c\ c$, the bait-holders on the opposite side of each plate from the bolt.

$d\ d\ d\ d$, the links connecting the bolts $c$ with the bait-holders.

In fig. 1 one of the plates $a$ is represented as held by its bolt $b$ in a horizontal position, and an animal nibbling at the bait.

This animal, by pulling at the bait, withdraws the bolt $b$ from the cross-bar $e$, on which it rests, when the wheel suddenly revolves, and the animal falls into the box.

The plate that was vertical takes the place of the one on which the animal stood, and closes the orifice.

A spring bar, $h$, prevents the wheel from rotating backward, while it presents no obstacle to its revolving in the right direction.

Springs $i\ i\ i\ i$, bearing against each link $d$, press the bolts $b$ outward, so that they may be always in readiness to catch against the cross-bar $e$.

The animal naturally clings to the bait as he falls, and, by so doing, carries the blades round until the trap is reset.

Having thus described our invention,

What we claim as new, and desire to secure by Letters Patent, is—

The combination of the plates $a$, bolts $b$, bait-holders $c$, links $d$, guard $h$, and springs $i$, all constructed and arranged to operate as described.

J. O. KOPAS.
GEORGE W. BAUER.

Witnesses:
CHAS. A. PETTIT,
SOLON C. KEMON.